United States Patent Office 3,575,738
Patented Apr. 20, 1971

3,575,738
FLUXES FOR SOFT SOLDERING
Hugo H. Becker, Chicago, Ill., assignor to Lake
Calumet Smelting Company, Chicago, Ill.
No Drawing. Original application July 5, 1966, Ser. No.
562,495, now Patent No. 3,459,606, dated Aug. 5, 1969.
Divided and this application Mar. 19, 1969, Ser. No.
808,680
Int. Cl. B23k 35/36
U.S. Cl. 148—25                                                4 Claims

ABSTRACT OF THE DISCLOSURE

Soldering fluxes manufactured from an admixture of rosin and water or isopropyl alcohol by addition thereto of ammonia or ammonium hydroxide in sufficient amount to convert said rosin to a soap.

---

This application is a divisional application of my U.S. patent application, Ser. No. 562,495, filed July 5, 1966, which issued on Aug. 5, 1969 as U.S. Pat. No. 3,459,606.

This invention relates to formulations of soldering fluxes for use in high speed automatic applications as well as in hand and semi-automatic applications that retain the corrosion inhibiting features of rosin based fluxes, while eliminating their undesirable properties.

Since time immemorial, rosin in organic solvents have formed the active bases in so called non-corrosive soldering fluxes, principally because the residues after soldering are highly non-hydroscopic and form barriers against moist air. In the soldering of electrical connections the residual rosin is highly non-conductive and remains so for long periods of time.

In modern high speed soldering operations rosin fluxes alone generally do not adequately clean the tarnished surfaces of the base metals to form void free bonds with the solders. In soldering plated metals, such as tin plated steel used for containers, the thickness of the coating has been reduced to a point where straight rosin fluxes are no longer effective.

In order to enhance the fluxing power of the rosin, additions are made of organic acids, such as oleic, citric, and the like, or hydro halides in the form of netural salts. While these are designed to break up into volatile components during the soldering operations to leave no residual acids, the volatile, free acids react with the base metals to leave corrosive metal halides. If these halides are adequately covered with a moisture barrier, atmospheric corrosion is effectively inhibited.

It is obvious from this that rosin is a desirable constituent of soldering fluxes whenever removal of the flux residues is uneconomical. In addition, rosin of the proper specification also provides a cover for the base metal and molten solder during the soldering operation to prevent oxidation of the metal surfaces.

There are serious disadvantages, however, to the use of rosin in fluxes. The incompatibility of rosin and water is a desirable feature in forming a moisture barrier against atmospheric corrosion, but it limits the amount of water soluble salts that may be combined without segregation from rosin in polar organic solvents.

Rosin solutions are highly viscous, building up on machine parts, and as the solvent evaporates, leave a hard residue very hard to remove. Rosin solutions have a high surface tension, limiting spread on the base metal, especially in capillaries such as those in lock and lap seams which results in voids in the interface between solder and base metal.

In the present formulation, the rosin and fatty acids are converted into soaps soluble in water as well as in organic solvents. The rosin soaps in solutions are compatible with a wide variety of water soluble halide salts without segregation of either. In addition, as a soap, the rosin is soluble in alcohol and other polar organic solvents with boiling points in a range suitable for the heating conditions of most soft soldering operations. As a soap, the rosin acts as a lubricant whenever the fluxed piece comes in contact with movable parts, and any buildup of such soap is readily removed with mild water or alcohol cleaning solutions avoiding buildup at those points common to rosin solutions.

Wetting of the surface to be soldered by the flux is a function of prime importance particularly in the interstices formed by lock and lap seams, the most common method of forming soldered joint. High surface tension of rosin alcohol solutions inhibit capillary rise. The greatly reduced surface tension of the rosin soap flux facilitates wetting of these areas. Thus the rosin soap is a wetting agent of itself and fatty acid soaps such as amine-oleates are added to further improve wetting.

This rosin soap flux will decompose or break up on heating it to soldering temperature, releasing volatile ammonia or amines, and leaving the rosin to provide a cover for the solder and base metal during the soldering operation and forming a moisture barrier after the soldered joint is completed.

The components or combinations to produce this formulation include a rosin capable of forming a soap with a base highly soluble in water and polar organic solvents. This rosin is heated to temperatures below the melting point of the solder, to form a cover over the molten solder and base plate during the soldering operations, but its boiling point and decomposition temperatures must be substantially above the optimum soldering temperature. The base is a volatile amine or ammonia at the soldering temperature so that no residue remains on the plate. Long chain fatty acids are chosen to form surfactants with the ammonia or the amines.

A type example contains 10% to 30% rosin and from 2% to 20% oleic acid in a suitable solvent. These fluxes have done a satisfactory job in many instances, but as the base metals are modified in the interest of lower cost, additions of organic hydro halides are necessary which release acids upon heating that act on the tarnished surface of the base metals. This flux may include 1% to 5% monoethanol amine hydrochloride in a suitable solvent. This type of flux leaves corrosive halide salts which are best inhibited by a moisture barrier formed by the residual rosin.

A typical formulation or combination which has been effectively used comprises the following proportions by weight:

|  | Parts |
|---|---|
| Water white gum rosin | 15 |
| Oleic acid | 1 |
| Ammonium hydroxide and amines | 5 |
| Monoethanol amine hydrochloride | 2 |
| Isopropyl alcohol | 75 |
| Water | 2 |

The formulation procedure in producing this combination is: crush the rosin into pieces ⅛ of an inch or less and dissolve in the alcohol; heat the rosin alcohol mixture to 125 degrees F. if necessary, to expedite forming a solution. When the rosin is in complete solution, add the oleic acid and ammonia thereto, and stir; mix concentrated hydrochloric acid with the monoethanolamine under adequate ventilation. Before adding the monoethanolamine hydrochloride to the previous mixture check it for pH (acidity); if the pH is more than 8 add hydrochloric acid slowly until the pH is between 7 and 8. If the pH is less than 7 add monoethanol amine until it is between 7 and 8. Add the water and mix with other ingredients, making the combination ready for use.

In this formulation amines may be substituted or combined with ammonium hydroxide to make up the 5 parts of the formula. Slightly more or less than 2 parts of water may be required if only amines or anhydrous acid are used.

This formula should be regarded as an example of a flux to obtain the desired properties for the objectives claimed, as other slight changes in the quantities and known ingredients may be incorporated without departing from the spirit and scope of the invention.

I claim:

1. A method of manufacturing a flux comprising the steps: (a) admixing the following ingredients substantially in the following quantities:

| | Parts |
|---|---|
| Gum rosin | 15 |
| Oleic acid | 1 |
| Ammonium hydroxide | 5 |
| Monoethanol amine hydrochloride | 2 |
| Isopropyl alcohol | 75 |
| Water | 2 | and (b) adjusting the acidity to below 8 and above 7 by slowly adding to the ingredients a member selected from the group consisting of hydrochloric acid and monoethanol amine.

2. The method of claim 1 in which the rosin is crushed to ⅛ inch pieces and dissolved in isopropyl alcohol heated to 125 degrees F., the oleic acid and base being added thereto with stirring.

3. A method of manufacturing a flux including the steps:

(a) admixing rosin in an amount from 10% to 30%, based on the weight of the flux, and oleic acid in an amount from 2% to 20%, based on the weight of the flux, in a solvent selected from the group consisting of water, isopropyl alcohol, and mixtures thereof;

(b) adding ammonia or ammonium hydroxide to the resulting admixture in an amount sufficient to convert said rosin to a rosin soap, and to convert said oleic acid to a soap; and (c) adjusting the pH of the resulting solution to between 7 and 8 by adding a member selected from the group consisting of hydrochloric acid, ammonia, and ammonium hydroxide.

4. The method of claim 3 including the step:

(d) adding to the resulting mixture an aqueous solution of monoethaolamine hydrochloride in the amount of 1% to 5% based on the weight of the flux.

References Cited

UNITED STATES PATENTS

| | | | |
|---|---|---|---|
| 2,491,913 | 12/1949 | Amberg | 260—97 |
| 3,205,052 | 9/1965 | Downing | 148—25 |
| 3,223,696 | 12/1965 | Boylan et al. | 260—97 |
| 3,266,949 | 8/1966 | Groves et al. | 148—25 |

OTHER REFERENCES

Harris, G.: Encyclopedia of Chemical Technology, December 1953, (page 807 relied on).

DONALD E. CZAJA, Primary Examiner

D. J. BARRACK, Assistant Examiner

U.S. Cl. X.R.

148—23; 106—219